(12) United States Patent
Zhang et al.

(10) Patent No.: US 7,687,185 B2
(45) Date of Patent: Mar. 30, 2010

(54) USING SACRIFICIAL MATERIAL TO MITIGATE CATALYST SUPPORT CORROSION IN FUEL CELL ELECTRODE

(75) Inventors: Jingxin Zhang, Rochester, NY (US); Hubert A. Gasteiger, Rochester, NY (US); Wenbin Gu, Pittsford, NY (US); Paul Taichiang Yu, Pittsford, NY (US); Jeanette E. O'Hara, Honeoye, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 824 days.

(21) Appl. No.: 11/459,427

(22) Filed: Jul. 24, 2006

(65) Prior Publication Data
US 2008/0020262 A1    Jan. 24, 2008

(51) Int. Cl.
*H01M 4/96*    (2006.01)
(52) U.S. Cl. ............................... 429/42; 429/44
(58) Field of Classification Search .................. 429/40, 429/42, 44
See application file for complete search history.

(56) References Cited

U.S. PATENT DOCUMENTS

| | | | | |
|---|---|---|---|---|
| 5,945,231 | A | * | 8/1999 | Narayanan et al. ......... 429/42 X |
| 6,593,023 | B2 | * | 7/2003 | Chang et al. ................... 429/44 |
| 6,855,453 | B2 | | 2/2005 | Bett et al. |
| 7,014,935 | B2 | * | 3/2006 | Knights et al. ............. 429/42 X |
| 7,201,993 | B2 | * | 4/2007 | Uchida et al. ................. 429/44 |
| 7,282,293 | B2 | * | 10/2007 | Ren et al. .................. 429/40 X |
| 7,332,240 | B2 | * | 2/2008 | O'Hara et al. ............ 429/44 X |
| 2002/0015879 | A1 | | 2/2002 | Gascoyne et al. |

FOREIGN PATENT DOCUMENTS

WO    01/59859 A1    8/2001

* cited by examiner

*Primary Examiner*—Stephen J. Kalafut

(57) ABSTRACT

A fuel cell includes an anode layer, a polymeric ion conductive membrane disposed over the anode layer, a cathode layer disposed over the polymeric ion conductive membrane, and an effective amount of a reactive material that corrodes at a higher rate than support carbon in the cathode layer, anode layer, or both. The reactive material is either proximate to or distributed within the cathode catalyst layer. In a variation, reactive material is also included proximate to the anode layer.

39 Claims, 6 Drawing Sheets

USING SACRIFICIAL MATERIAL TO MITIGATE CATALYST SUPPORT CORROSION IN FUEL CELL ELECTRODE

BACKGROUND OF THE INVENTION

1. Field of the Invention

The present invention relates fuel cells with improved electrode durability.

2. Background Art

Fuel cells are used as an electrical power source in many applications. In particular, fuel cells are proposed for use in automobiles to replace internal combustion engines. In proton exchange membrane ("PEM") type fuel cells, hydrogen is supplied as fuel to the anode of the fuel cell and oxygen is supplied as the oxidant to the cathode. The oxygen can be either in a pure form ($O_2$) or air (a mixture of $O_2$ and $N_2$). PEM fuel cells typically have a membrane electrode assembly ("MEA") in which a solid polymer membrane has an anode catalyst on one face and a cathode catalyst on the opposite face. The MEA, in turn, is sandwiched between a pair of porous diffusion media ("DM") which in turn are sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts. In order to produce electricity efficiently, the polymer electrolyte membrane of a PEM fuel cell typically must be thin, chemically stable, proton transmissive, non-electrically conductive, and gas impermeable. In typical applications, fuel cells are provided in arrays of many individual fuel cell stacks in order to provide high levels of electrical power.

With reference to FIG. 1, a schematic illustration of the normal operation and the processes occurring during either local $H_2$ fuel starvation and start/stop induced degradation of a typical fuel cell stack with prior art MEAs is provided. Fuel cell 10 includes anode layer 12 and cathode layer 14 with polymeric ion conductive membrane 16 disposed between anode layer 12 and cathode layer 14. Currently, a normal cathode layer includes about 0.2 to 0.4 mg of platinum per $cm^2$ with a typical cathode catalyst having approximately 20 to 60% weight Pt supported on a high-surface area carbon support ("x % wt. Pt/C"). Moreover, cathode layers are very porous in order to provide efficient access for the oxygen (from air) and $H_2$ gas. In a typical cathode layer the volume fraction of polymer is about 20%, the volume fraction of carbon is about 20%, and the void volume is about 60%. Hydrogen ($H_2$) is supplied to anode layer 12 via reactant flow-field channels 20 and through anode diffusion media 18. On the opposite side of fuel cell stack 10, oxygen ($O_2$ usually from air) is fed to cathode layer 14. During normal operation, the hydrogen oxidation reaction ("HOR") occurs at anode layer 12, and the oxygen reduction reaction ("ORR") occurs at the cathode (see left-hand side of FIG. 1). The oxygen gets reduced to make water while the hydrogen gets oxidized to make protons. The protons traverse membrane 16, where they recombine with the oxygen to complete the overall reaction of the fuel cell of hydrogen plus oxygen to give water.

During the operation of such fuel cells, situations can occur occasionally which might cause corrosion of the catalysts' carbon-supports, either on the anode and/or the cathode. This carbon corrosion can arise for several reasons: 1) maldistribution of $H_2$ between the many cells of a fuel cell stack under certain operating conditions can lead to understoichiometric supply of $H_2$ to one of the cells (i.e., less $H_2$ is supplied than is required to sustain the applied current), leading to a large increase of the anode potential (commonly referred to as "cell reversal"), accompanied by corrosion of the carbon-support of the anode catalyst (see, e.g., D. P. Wilkinson, J. St.-Pierre, in: *Handbook of Fuel Cells—Fundamentals, Technology, and Applications* (eds.: W. Vielstich, A. Lamm, H. A. Gasteiger), Wiley (2003): vol. 3, chapter 47, pg. 611); 2) maldistribution of $H_2$ within a cell due to liquid-water induced blockage of anode flow-field channels and/or water-film formation within the anode diffusion medium (commonly referred to as "local $H_2$ starvation"), leading to a local increase of the cathode potential due to $O_2$ permeation through the membrane from cathode to anode, which in turn corrodes the carbon-support of the cathode catalyst (see, e.g., T. W. Patterson, R. M. Darling, *Electrochem. Solid-State Lett.* 9 (2006) A183); 3) formation of a $H_2$/air front in the anode flow-field channel during fuel cell shutdown (i.e., air permeation into the $H_2$-filled anode flow-field channels) or startup (i.e., $H_2$ flow into air-filled anode flow-field channels) processes (commonly referred to as "start/stop degradation"), leading to localized increase of the cathode potential, which in turn corrodes the carbon-support of the cathode catalyst (see, e.g., C. A. Reiser, L. Bregoli, T. W. Patterson, J. S. Yi, J. D. Yang, M. L. Perry, T. D. Jarvi, *Electrochem. Solid-State Lett.* 8 (2005) A273).

Cell reversal occurs when understoichiometric amounts of $H_2$ are applied to one or several cells of a fuel cell stack so that the overall fuel cell stack current cannot be sustained by $H_2$ oxidation ($H_2 \rightarrow 2H^+ 2e^-$). In this case, electron/protons must be supplied by alternative reactions, namely by the carbon oxidation reaction ("COR") and/or the $O_2$ evolution reaction ("OER") in the anode electrode:

OER: $H_2O \rightarrow \frac{1}{2}O_2 + 2H^+ + 2e^-$  $E_0 = +1.23$ V vs RHE  (1)
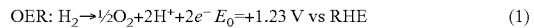

COR: $C + 2H_2O \rightarrow CO_2 + 4H^+ + 4e^-$  $E_0 = +0.21$ V vs RHE  (2)
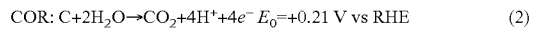

(where $E_0$ is the potential referenced to the Reversible Hydrogen Electrode (RHE) potential)

Since the OER is negligible for Pt catalysts on conventional carbon supports (e.g., Pt/Ketjen Black and Pt/Black Pears listed in Table 1), this cell reversal leads to corrosion of the anode catalyst carbon-support according to Reaction (2), leading to rapid performance degradation of the MEA.

In the case of local $H_2$ starvation in the anode electrode 12 (FIG. 1), $O_2$ permeating from the cathode layer 14 (commonly referred to as "$O_2$ crossover") through the ion conducting membrane 16 is reduced in the region where $H_2$ is depleted, leading to carbon-support corrosion of the cathode catalyst carbon-support in the cathode catalyst layer 14. As is shown in FIG. 1, this can occur by depletion of $H_2$ in the anode flow-field channel 20 due to water blockage, such that region 20' is still filled with $H_2$ while region 20" is depleted of $H_2$. Alternatively, if a water film 22 is formed in the anode diffusion medium, $H_2$ will be depleted in the anode catalyst layer 12 adjacent to the water film 22. Thus, significant corrosion of the carbon-support of the cathode catalyst will occur in the cathode catalyst layer 14 which is adjacent to region 20" or 22. This leads to irreversible degradation of the MEA performance.

Start/stop degradation occurs in the presence of a $H_2$/air front in the anode flow-field channels during either startup or shutdown of a fuel cell. This case is represented in FIG. 1 when region 20' of the anode flow-field channels contains $H_2$ while region 20" contains air. Again, this leads to corrosion of the carbon-support of the cathode catalyst in the cathode catalyst layer 14 which is adjacent to region 20".

There are a few system strategies that may help reduce the impacts of cell reversal, such as monitoring the cell voltage of each individual cell and reducing fuel cell stack power when reversal of the cell voltage of a single cell in the fuel cell stack is observed, but this and other measures will increase the total cost. Local $H_2$ starvation caused by water blockage of anode flow channels and/or anode diffusion medium flooding may be relieved by special design of the flow field plates which is also costly. Also, U.S. Pat. No. 6,855,453 discloses a method of reducing carbon corrosion utilizing a catalyst to promote the reaction (2) and thereby simultaneously suppressing the carbon corrosion reaction (1). The implementation of graphitized carbon support (more corrosion-resistant) has been identified as one key solution to the carbon corrosion problem, which itself still needs a significant amount of developmental work and is currently in its infancy. However, such graphitized support strategies alone do not sufficiently reduce carbon corrosion rates under localized $H_2$ starvation and start/stop conditions.

Accordingly, there exists a need for improved membrane electrode assemblies that have more tolerance to anode local $H_2$ starvation and cell reversal.

SUMMARY OF THE INVENTION

The present invention overcomes one or more problems of the prior art by providing in at least one embodiment a fuel cell with improved durability by reducing the carbon corrosion of the anode and cathode catalyst carbon-support during cell reversal and local $H_2$ starvation, respectively. The fuel cell of this embodiment includes an anode layer, a polymeric ion conductive membrane disposed over the anode layer, a cathode layer disposed over the polymeric ion conductive membrane, and an effective amount of a reactive material that electro-oxidizes at a higher rate than the anode and/or cathode catalyst carbon-support. The cathode layer and the anode layer each independently comprise a catalyst attached to a carbon-support. The reactive material is either proximate to or distributed within the anode and/or cathode catalyst layer. In one embodiment, this reactive material is a high-surface area carbon material which corrodes according to Reaction (1) at a faster rate than the carbon-support used in the anode and/or cathode catalyst. More generally, the reactive material can be any other material which electro-oxidizes at a higher rate than the carbon-support of the anode and/or cathode catalyst, producing electrons and protons which then prevents corrosion of the carbon-support of the anode and/or cathode catalyst.

Additional advantages and embodiments of the invention will be obvious from the description, or may be learned by practice of the invention. Further advantages of the invention will also be realized and attained by means of the elements and combinations particularly pointed out in the appended claims. Thus, it is to be understood that both the foregoing general description and the following detailed description are exemplary and explanatory of certain embodiments of the invention and are not restrictive of the invention as claimed.

DETAILED DESCRIPTION OF THE PREFERRED EMBODIMENT(S)

Figure 1:
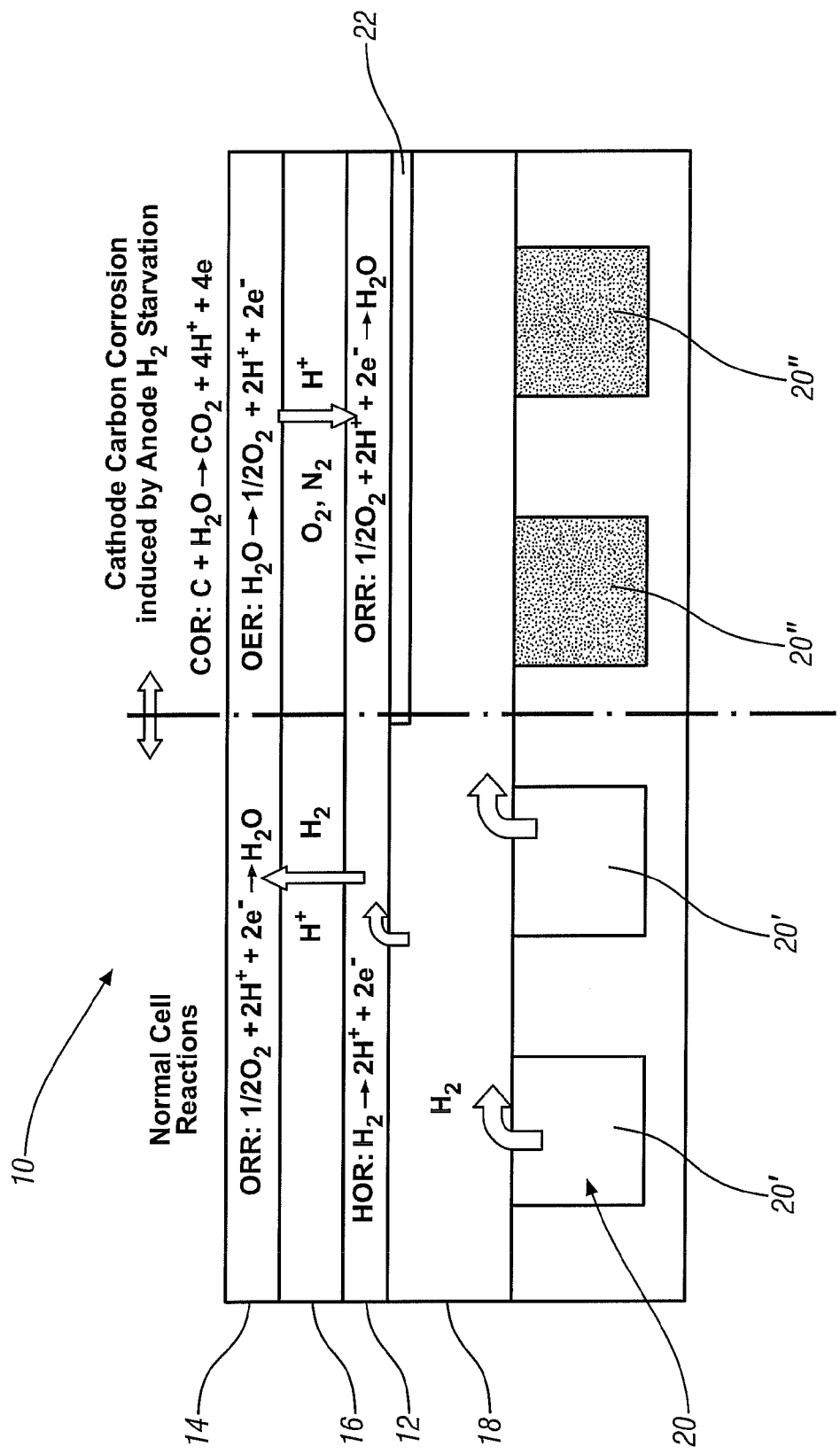
FIG. 1 is a schematic illustration of a prior art fuel cell showing both normal operation and corrosion situations.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 2:
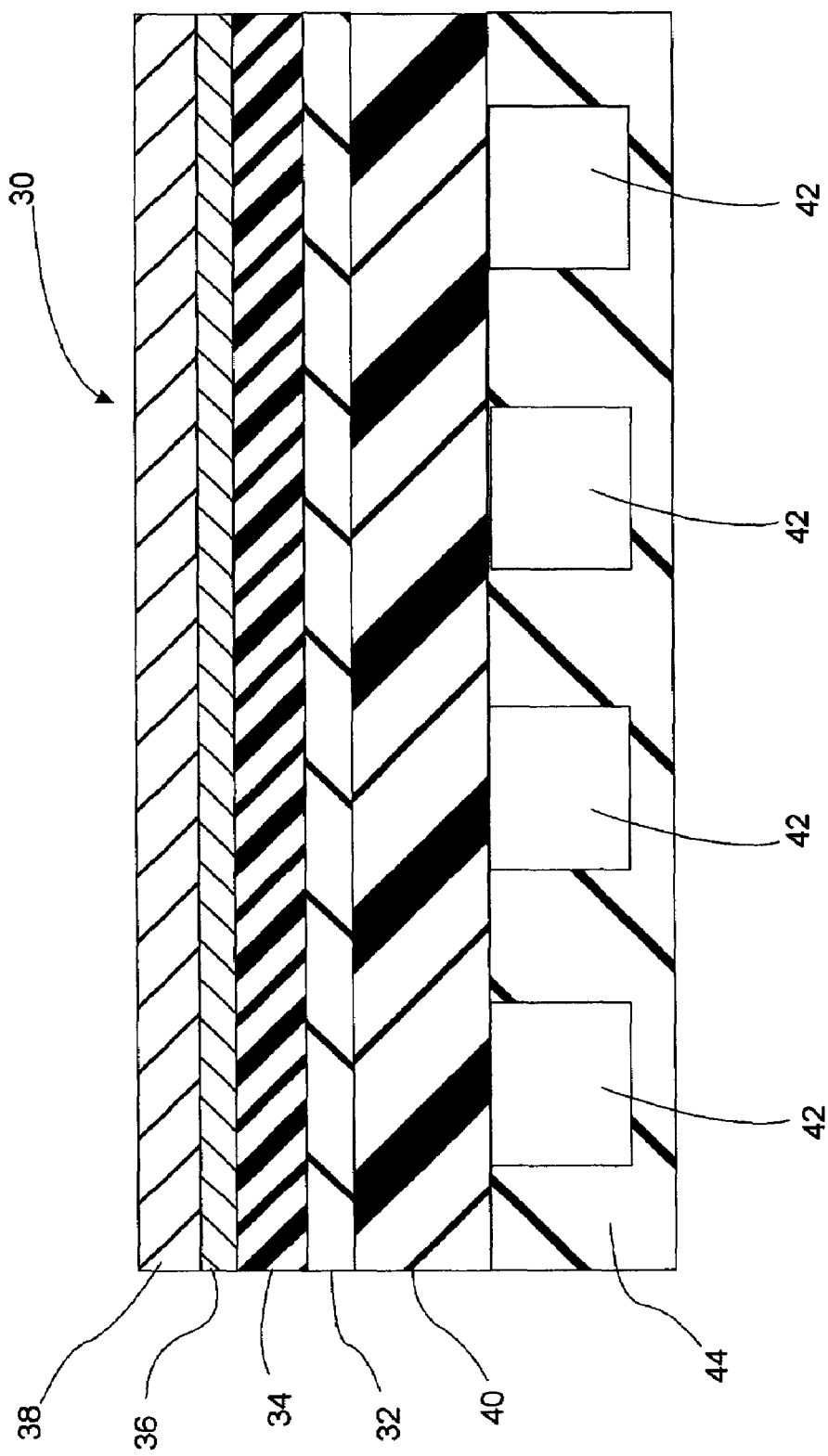
FIG. 2 is a schematic illustration of a fuel cell having a sacrificial layer disposed between a polymeric ion conductor layer and a cathode layer.

With reference to FIG. 2, a schematic illustration of an embodiment of the fuel cell of the invention is provided. Fuel cell stack 30 includes anode layer 32 over which polymeric ion conductive membrane 34 is disposed. Polymeric ion conductive membrane 34 comprises a proton conductive material. In a variation, polymeric ion conductive membrane 34 is both disposed over and physically contacts anode layer 32. Anode layer 32 is typically an anode catalyst layer that includes a catalyst impregnated on a support material. Suitable catalysts include precious metals or alloys thereof or precious metal/base-metal alloys or other catalysts for the $H_2$ oxidation reaction known in the art. Examples of suitable polymeric ion conductive membranes include the Nafion membrane developed by DuPont as a proton conductive membrane, other perfluorosulfonic acid ionomer membranes, hydrocarbon based membranes, or membranes which include phosphoric acid as ion conducting entity (e.g., polybenzimidazol based membranes).

First sacrificial layer 36 is disposed over and contacts polymeric ion conductive membrane 34. Cathode layer 38 is similarly disposed over and contacts first sacrificial layer 36. Cathode layer 38 is a cathode catalyst layer that includes a catalyst supported on carbon. Again, suitable catalysts include precious metals and alloys thereof or precious metal/base-metal alloys or other catalysts for the $O_2$ reduction reaction known in the art. Also shown in FIG. 2 is anode diffusion medium 40 through which hydrogen diffuses to reach anode layer 32 and fuel flow channels 42 which are defined by channels in electrical plate 44. In one variation, first sacrificial layer 36 has a thickness ranging from 1 to 20 μm. In another variation, first sacrificial layer 36 has a thickness ranging from 1 to 10 μm. In still another variation, first sacrificial layer 36 has a thickness ranging from 2 to 5 μm.

First sacrificial layer 36 advantageously includes an effective amount of a reactive material that electro-oxidizes at a greater rate than the carbon that supports the catalyst in the cathode (referred to as "cathode catalyst carbon-support"). An effective reactive material has an electro-oxidation rate (i.e., corrosion rate) that is at least 2 times greater than the electro-oxidation rate of the cathode catalyst carbon-support in cathode layer 38. In other variations, the electro-oxidation rate of the reactive material is at least 5 times greater than the electro-oxidation rate of the cathode catalyst carbon-support in cathode layer 38. In still other variations, the electro-oxidation rate of the reactive material is at least 10 times greater than the electro-oxidation rate of the cathode catalyst carbon-support in cathode layer 38. Typically, useful reactive materials have high BET surface areas. In a variation, the BET surface area is from about 200 to about 2000 $m^2/g$. In another variation, the BET surface area is from about 200 to about 2000 $m^2/g$.

A particularly useful reactive material includes varieties of carbon that electro-oxidize at a higher rate than the carbon-support of the cathode catalyst in the cathode layer. Examples of useful carbons for the reactive material include, but are not limited to, Black Pearl, Ketjen Black, Vulcan carbon, activated amorphous carbons, and other high-surface area carbons known in the art, as well as mixtures and combinations thereof Table 1 provides the carbon corrosion rates on various carbon types. The data of Table 1 is measured for carbons and catalyzed carbons applied to an MEA and corroded at 95° C. and 80% relative humidity in nitrogen at a potential of 1.2V relative to a reversible hydrogen reference electrode ("RHE") operating at 95° C. and 120 kPa abs $H_2$.

| Carbon type | BET surface area [$m^2/g_{carbon}$] | Corrosion rate [$A/g_{carbon}$] |
|---|---|---|
| Black Pearl | 1600 | 0.37 |
| Pt/Black Pearl | 1600 | 0.74 |
| Ketjen Black | 800 | 0.19 |
| Pt/Ketjen Black | 800 | 0.39 |
| Pt/Acetylene Black | 250 | 0.089 |
| Pt/Gr-Ketjen Black | 160 | 0.0082 |
| Gr-Ketjen Black | 160 | 0.0051 |

As is shown in Table 1, carbons with high BET surface areas (determined by the method outlined in Brunauer, S., P. H. Emmett, and E. Teller: J. Am. Soc., 60, 309, 1938), viz., Black Pearl and Ketjen Black, have a high carbon corrosion rate under these conditions. Catalyzation of these carbons with platinum (or other noble metals and noble metal oxides) typically increases the corrosion rates of these carbons by a factor of 2 (see Table 1). If compared to more corrosion resistant carbon-supports (either catalyzed or non-catalyzed), viz., Acetylene Black, Graphitized Ketjen Black, etc., the corrosion rates of Black Pearls and Ketjen Black are significantly higher so that they can be used as sacrificial carbons if cathode catalysts are supported on acetylene blacks or graphitized carbon blacks (e.g., graphitized Ketjen Black, graphitized Black Pearls, graphitized Vulcan Carbon, etc.). It may be noted from Table 1, that the corrosion rate of carbons is not only enhanced by increasing their BET surface areas, but also by decreasing their graphitic character (e.g., the corrosion rate of Ketjen Black is approximately 30 times larger than that of graphitized Ketjen Black, even though its BET surface area is only 5 times larger). In general, suitable sacrificial carbons are carbons which have low graphitic character (i.e., highly amorphous carbons) and/or high BET surface areas, as is the case for Ketjen Black, Black Pearls, activated carbons, and so-called thermal blacks. In a more general sense, any suitable sacrificial material is a material which corrodes at a higher rate (reference to its mass) compared to the corrosion rate of the carbon-support used in the cathode catalyst.

It may be apparent to someone skilled in the art, that the amount of sacrificial material which can be applied to the sacrificial layer 36 must be limited in order to not reduce the performance of the MEA. The protons generated in the anode catalyst layer 32 must travel through both the proton conducting membrane 34 and the sacrificial layer 36 in order to be consumed by the cathode reaction in the cathode catalyst layer 38. Therefore, the proton conductivity of the sacrificial layer 36 must be high in order to not significantly reduce the performance of the MEA. This requires that the sacrificial layer 36 has sufficient ionomer content (the proton conducting material) and is sufficiently thin. Suitable sacrificial carbons like Black Pearl and Ketjen Black are highly structured carbons and, therefore, a low packing density of ca. 20% volume. This implies that a sacrificial carbon layer at a loading of 0.2 $mg_{carbon}/cm^2$ has a thickness of approximately 5 micrometer and can contain up to 80% volume of the proton conducting ionomer. Sacrificial carbons with a higher packing density are therefore desirable, as they would allow to minimize the thickness of the sacrificial carbon layer and/or increase the loading of the sacrificial carbon in the layer. Therefore, suitable reactive materials, and in particular sacrificial carbons, in the spirit of this invention are materials with a packing density equal to or greater than 20% volume. In other variations of the invention, the reactive materials (or carbons) have a packing density equal to or greater than 40% volume. In still other variations, the reactive materials (or carbons) have a packing density equal to or greater than 50% volume. Similarly, it is obvious to the one skilled in the art that a significant fraction of the void volume of the sacrificial layer can be filled by proton conducting material in order to improve the proton conduction through this layer. In a variation, the proton conductive material fills from about 20% to about 100% of the void volume.

In summary, suitable sacrificial carbons are highly amorphous, have a high BET surface area, and a high packing density (measured, e.g., by low DBP values (see: T. Tada, in: *Handbook of Fuel Cells—Fundamentals, Technology, and Applications* (eds.: W. Vielstich, A. Lamm, H. A. Gasteiger), Wiley (2003): vol. 3, chapter 38, pg. 481)).

While the best proton conductivity of the sacrificial carbon layer occurs when all of the void volume is filled by proton conducting material, there is an optimum volume fraction of proton conducting material where proton conductivity is maximized while not reducing the electron conductivity through the sacrifical carbon layer since the proton conducting material is generally an electrical insulator, except when proton conducting materials are used which are also electrically conductive (i.e., electron conducting polymers with proton conducting groups).

From the above description it is also apparent that any other sacrificial material, which can be used in the sacrificial layer 36 will have the same requirements with regards to packing density and corrosion rate.

In certain other variations of the present embodiment, and in particular, when the reactive material is carbon, the reactive material is present in an amount of 0.1 to 0.4 mg/cm$^2$. In other variations of the present embodiment, and in particular when the reactive material is carbon, the reactive material is present in an amount of 0.1 to 0.2 mg/cm$^2$. In a more specific embodiment, at a loading of 0.2 mg/cm$^2$ of sacrificial carbon (~5 μm thick as a separate layer), the projected improvement of the present embodiment is about 5 to 10 times compared to an MEA which does not have a sacrificial carbon layer.

The carbon that is used for supporting the catalysts in anode layer 32 and cathode layer 38 should be durable and corrosion resistant. A usable type of carbon is the graphitized carbon disclosed in U.S. Pat. No. 6,855,453. The entire disclosure of this patent is hereby incorporated by reference. This graphitized carbon is a heat-treated carbon (at about 3000° C.) in which the structure of conventional carbon is transformed from amorphous to crystallite. Other suitable cathode catalyst carbon-supports are acetylene blacks. In general, as outlined above, a critical measure describing the efficacy of sacrificial layers is the ratio of corrosion rate between the sacrificial material and the carbon-support of the cathode catalyst in the cathode catalyst layer.

Figure 3:
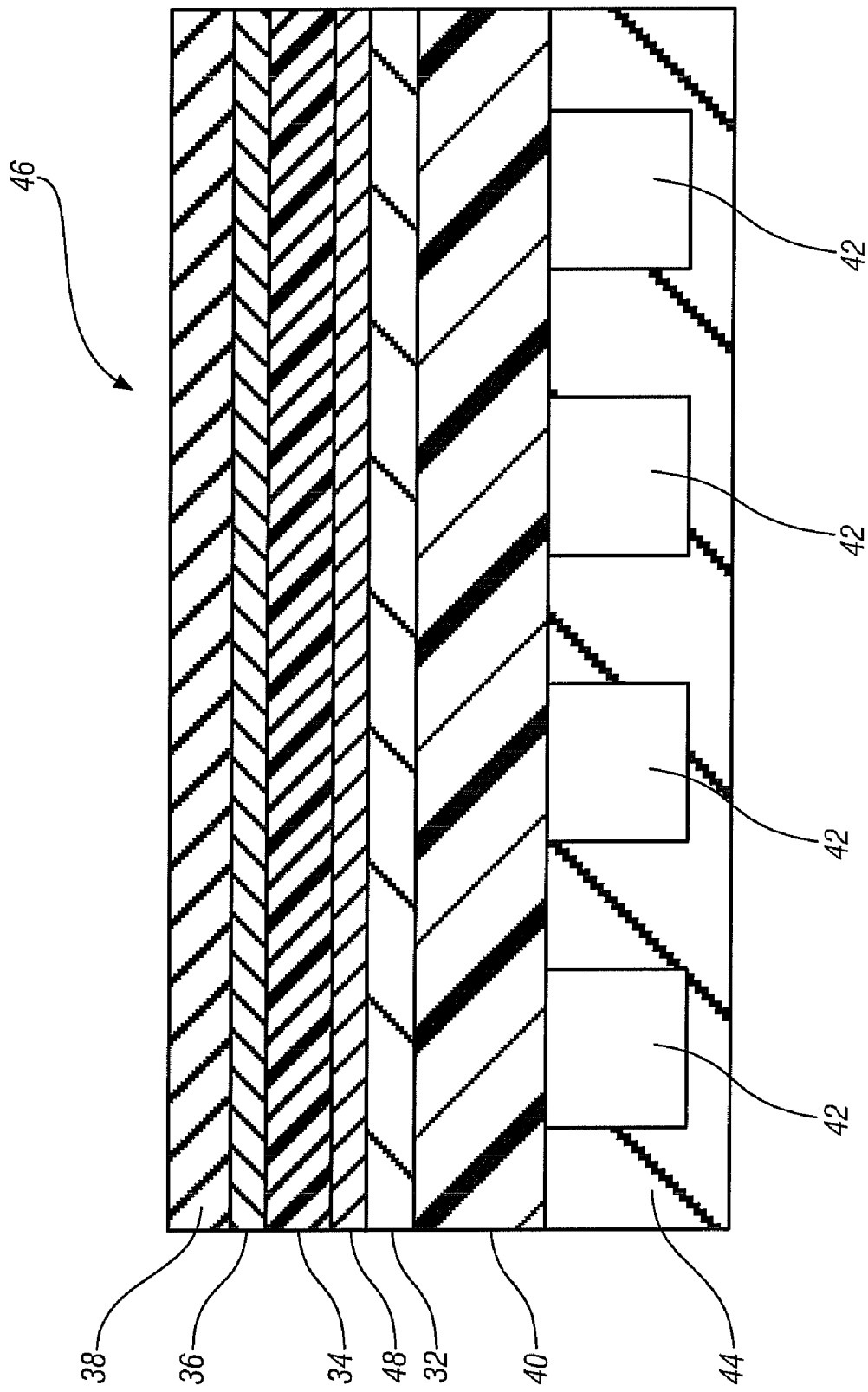
FIG. 3 is a schematic illustration of a fuel cell having a first sacrificial layer disposed between the polymeric ion conductor layer and the cathode layer and a second sacrificial layer between the polymeric ion conductor layer and the anode layer.

With reference to FIG. 3, a schematic illustration of another embodiment of the fuel cell of the invention is provided. This embodiment corresponds to the embodiment described in connection with FIG. 2 but with a second sacrificial layer interposed between anode layer 32 and polymeric ion conductive membrane 34. Moreover, this embodiment allows anode corrosion resistance in situations of cell reversal as described above in the background section. Fuel cell stack 46 includes anode layer 32 over which second sacrificial layer 48 is disposed. In this embodiment, polymeric ion conductive membrane 34 is disposed over sacrificial layer 48. In a variation, polymeric ion conductive membrane 34 is both disposed over and physically contacts polymeric ion conductive second sacrificial layer 48. Anode layer 32 is typically an anode catalyst layer that includes a catalyst impregnated on a support material. Sacrificial carbon layer 36 is disposed over and contacts polymeric ion conductive membrane 34. Cathode layer 38 is similarly disposed over and contacts sacrificial layer 36. Cathode layer 38 is a cathode catalyst layer that includes a catalyst supported on carbon. In one variation, second sacrificial layer 48 has a thickness ranging from 1 to 20 μm. In another variation, second sacrificial layer 48 has a thickness ranging from 1 to 10 μm. In still another variation, second sacrificial layer 48 has a thickness ranging from 2 to 5 μm.

In the present embodiment, both first sacrificial layer 36 and second sacrificial layer 48 includes an effective amount of a reactive material that electro-oxidizes at a greater rate than the carbon that supports the catalyst in the cathode and anode. In this embodiment, first sacrificial layer 36 and second sacrificial layer 48 both include an effective amount of a reactive material that electro-oxidizes at a greater rate than the carbon that supports the catalyst in the cathode and in the anode. An effective reactive material has an electro-oxidation rate (i.e., corrosion rate) that is at least 2 times greater than the electro-oxidation rate of the catalyst carbon-support in cathode layer 38 and anode layer 32. Preferably, the electro-oxidation rate of the reactive material is 5 times greater than the electro-oxidation rate of the catalyst carbon-support in cathode layer 38 and anode layer 32 Most preferably, the electro-oxidation rate of the reactive material is 10 times greater than the electro-oxidation rate of the catalyst carbon-support in cathode layer 38 and anode layer 32. In this embodiment, the characteristics of the sacrificial layers 48 and 36 are the same as those outlined above in the description of FIG. 2.

Figure 4:
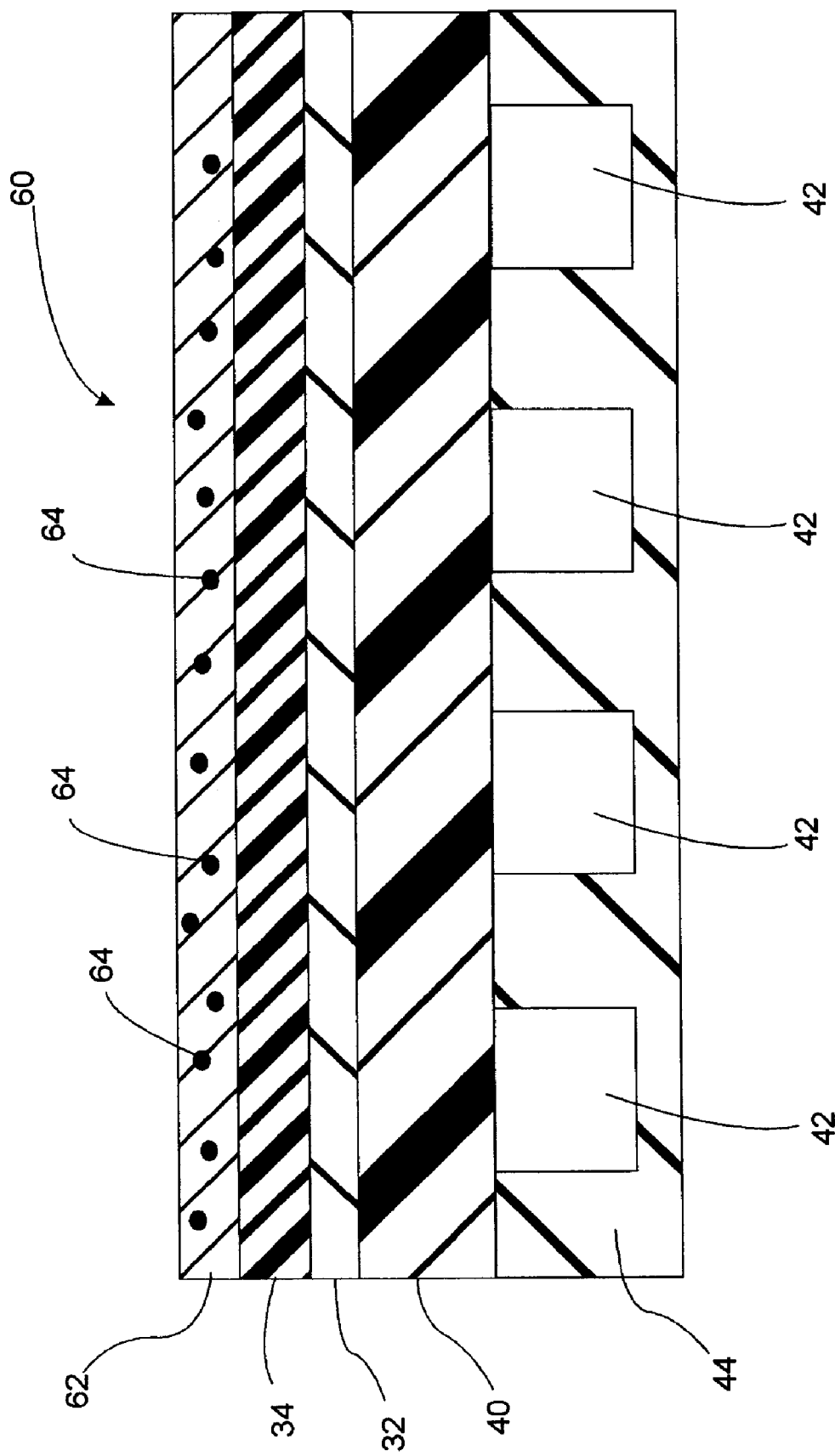
FIG. 4 is a schematic illustration of a fuel cell having reactive material dispersed throughout the cathode layer.

With reference to FIG. 4, a schematic illustration of still another embodiment of the fuel cell of the invention is provided. Fuel cell 60 includes anode layer 32 over which polymeric ion conductive membrane 34 is disposed. In a variation, polymeric ion conductive membrane 34 is both disposed over and physically contacts anode layer 32. Anode layer 32 is typically an anode catalyst layer that includes a catalyst impregnated on a support material. Cathode layer 62 is similarly disposed over polymeric ion conductive membrane 34. An effective amount of reactive material 64 is distributed throughout (i.e., dispersed) cathode layer 62. Cathode layer 62 includes a catalyst supported on carbon. As set forth above, reactive material 64 is a material that electro-oxidizes at a greater rate than the carbon that supports the catalyst in the cathode with an effective amount being the same as the amount set forth above in connection with the description of FIG. 2. Moreover, the characteristics of the reactive material including amounts, void volumes, and use of carbon are the same as set forth above in connection with the description of FIG. 2.

Figure 5:
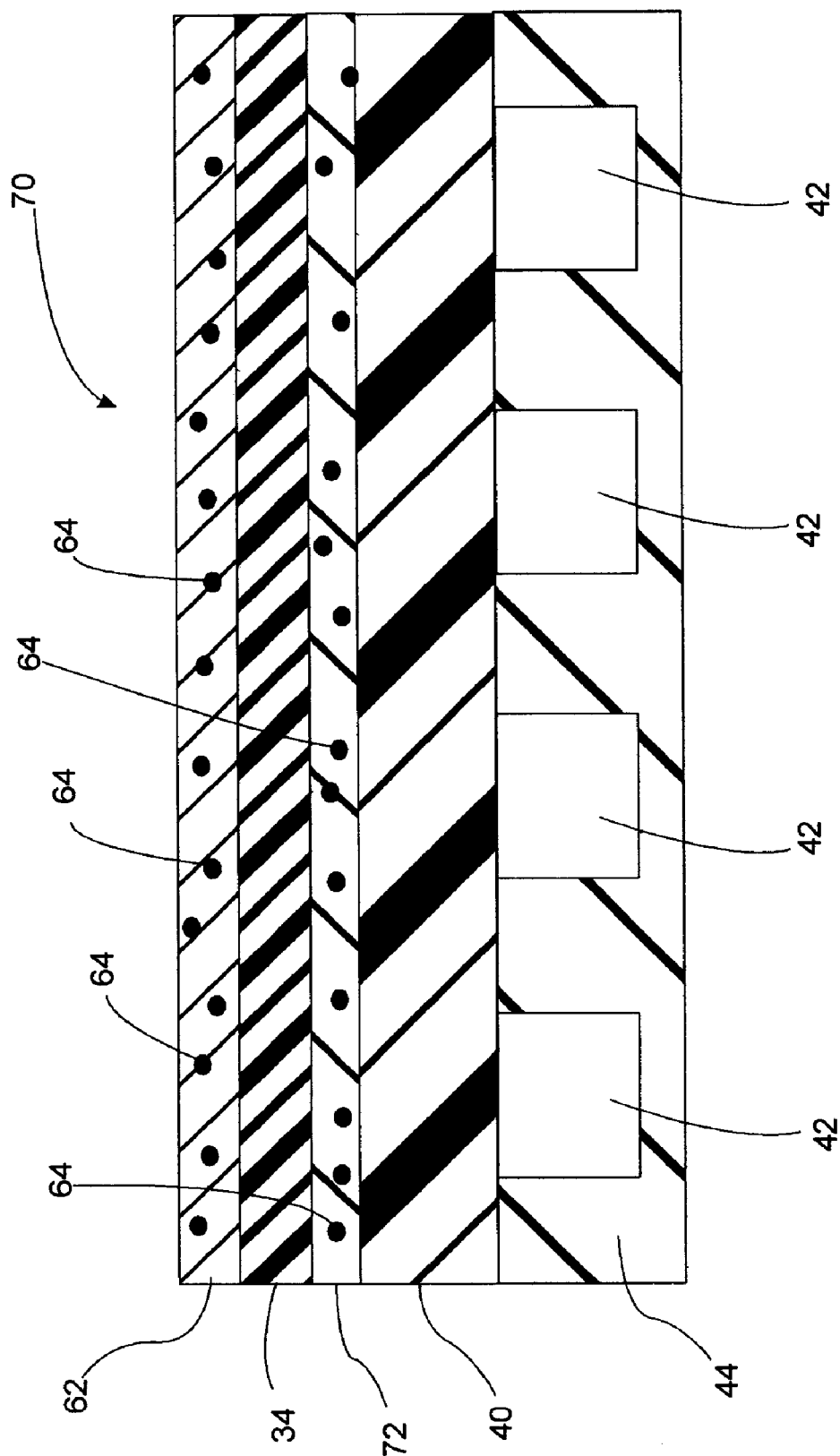
FIG. 5 is a schematic illustration of a fuel cell having reactive material dispersed throughout the cathode layer and the anode layer.

With reference to FIG. 5, a schematic illustration of yet another embodiment of the fuel cell of the invention is provided. Fuel cell 70 includes anode layer 72 over which polymeric ion conductive membrane 34 is disposed. In a variation, polymeric ion conductive membrane 34 is both disposed over and physically contacts anode layer 72. Anode layer 72 includes a catalyst impregnated on a support material. Cathode layer 62 is similarly disposed over polymeric ion conductive membrane 34. An effective amount of reactive material 64 is distributed throughout (i.e., dispersed) anode layer 72 and cathode layer 62. As set forth above, cathode layer 62 is a cathode catalyst layer that includes a catalyst supported on carbon. As set forth above, reactive material 64 is a material that electro-oxidizes at a greater rate than the carbon that supports the catalyst in the cathode with an effective amount being the same as the amount set forth above in connection with the description of FIG. 2. Moreover, the characteristics of the reactive material including amounts, void volumes, and use of carbon are the same as set forth above in connection with the description of FIG. 2.

Each of the embodiments of the present invention set forth above include sacrificial materials either in discrete layers or dispersed within an electrode. Suitable sacrificial materials are carbons, specifically those types of carbons known to have high carbon corrosion rates, which can derive from both high BET surface areas and/or low graphitic character (e.g., non-graphitized furnace blacks, thermal blacks, activated carbons, etc.). Examples of carbon types that are suitable for use in the present invention include, but are not limited to, Black Pearl, Ketjen Black, and the like. Highly amorphous, low-structure (i.e., carbons with low DBP values), and/or high BET surface area carbons are particularly suitable for use as the sacrificial carbon of the present invention. In another variation of the invention, the sacrificial carbon includes catalytic additives to catalyze the carbon corrosion rate (see Table 1), whereby low concentrations of catalytically active additives can be used (0.5 to 50% by weight, preferably 0.5 to 5% by weight). Examples of suitable noble metal additives include, but are not limited to, noble metals, nobel metal alloys, noble metal/base-metal alloys, or oxides thereof. Specific examples include, but are not limited to, Pt, Pd, Ir, Ru, and Rh in their metallic form or as oxides, as well as alloys and mixtures thereof.

Several considerations enter into optimization of the thickness of the sacrificial carbon layer. For example, as the thickness of the layer increases the proton transport resistance of the fuel cell increases. A sacrifical carbon layer at loading of 0.2 mg/cm$^2$ and using high-structure carbon blacks (e.g., Ketjen Black, Black Pearls, etc.) would have a thickness of approximately 5 μm. It should be remembered that the thickness of the membrane is typically about 25 μm. Because protons must cross the sacrificial carbon layer to reach the cathode, the sacrificial carbon layer must also function as ion conductor thereby making higher amounts of ionomer in the void volume formed within the sacrificial carbon layer desirable. However, electron conductivity requirements tend to make it desirable to increase the carbon content in the sacrificial carbon layer. For this reason, sacrificial carbons with higher packing density are desired. The thickness of sacrificial layers outlined in this invention ranges from 1 to 20 micrometer, preferably 1 to 10 micrometer, and most preferably from 2 to 5 micrometer.

Figure 6:
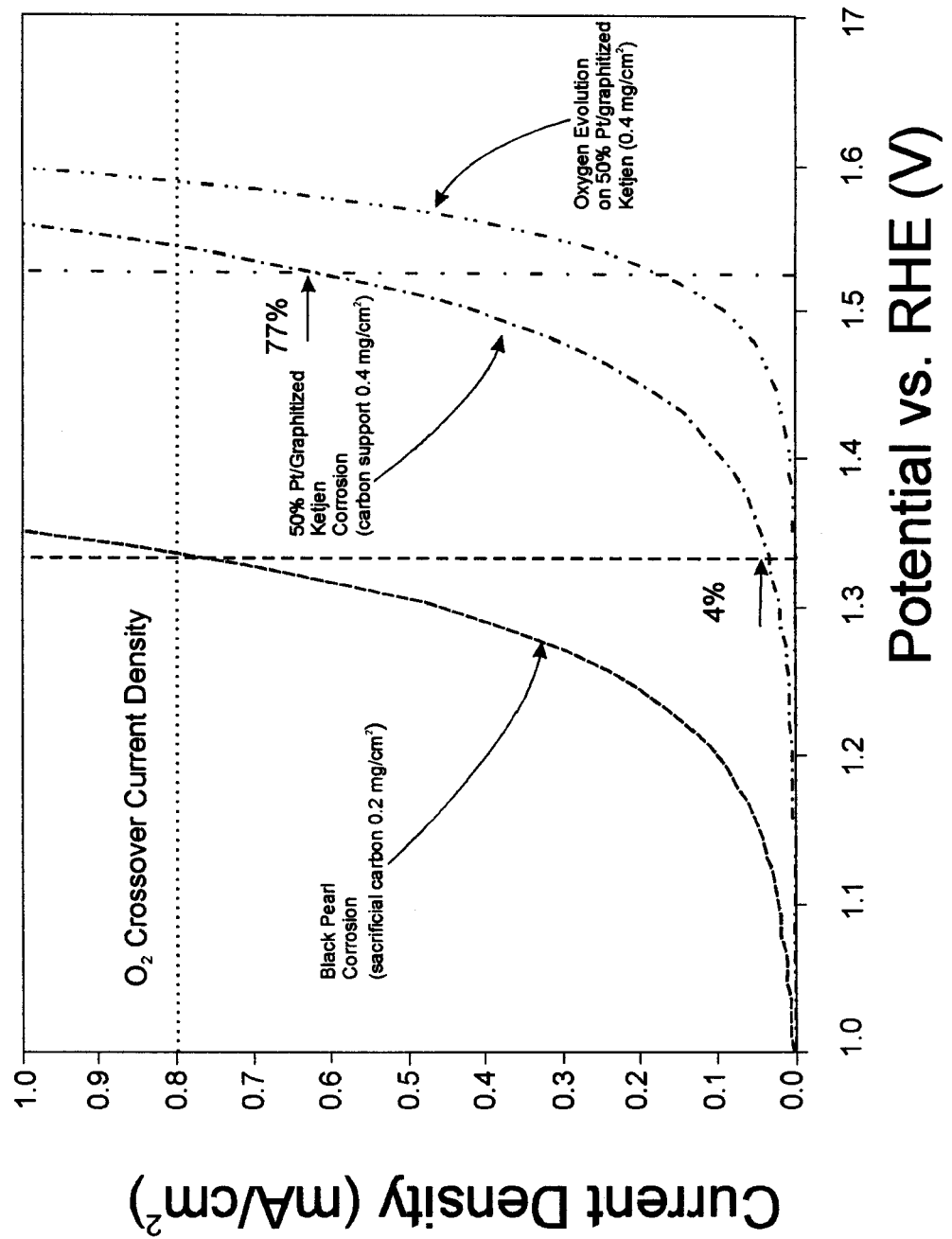
FIG. 6 provides plots of current density versus electrical potential for the oxygen evolution of 50% Pt/Graphitized Ketjen, carbon corrosion on 50% Pt/Graphitized Ketjen, carbon corrosion on Black Pearl.

With reference to FIG. 6, plots of current density versus electrical potential are provided. In FIG. 6 the current density versus potential for oxygen evolution on 50% Pt/graphitized Ketjen (0.4 mg/cm$^2$) is given in accordance with reaction (1) listed above. During fuel cell stack operation, $O_2$ molecules that permeate from cathode to anode throughout the polymeric ion conductive membrane can be expressed as an $O_2$ cross-over current. In accordance with the present invention, this $O_2$ cross-over current can be balanced by the summation of oxygen evolution current and the carbon corrosion currents from the cathode catalyst layer and sacrificial carbon corrosion current. The carbon corrosion reactions are in accordance with reaction (2) set forth above. FIG. 6 provides an example when the cathode layer includes Pt/graphitized Ketjen Black and the sacrificial carbon layer is Black Pearl carbon. It is also determined that 77% of $O_2$ cross-over current that is balanced by the current of the corrosion of Pt/Gr-Ketjen Black if the sacrificial carbon is not used as indicated in FIG. 6. When a sacrificial carbon layer is present, only 4% of $O_2$ cross-over current is balanced by the corrosion of Pt/Gr-Ketjen Black with the remainder of the need current to balance the $O_2$ cross over current coming from the corrosion of the sacrificial carbon layer. The ability of the sacrificial carbon layer to be preferential corroded is easily determined from the current density versus potential plot for black pearl corrosion in FIG. 6 as the intersection of this plot with the $O_2$ cross over current. Accordingly, FIG. 6 demonstrates that sacrificial carbon is easier to corrode than the carbon that is used as a catalyst support in the catalyst layer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fuel cell comprising:
   an anode catalyst layer;
   a polymeric ion conductive membrane disposed over the anode catalyst layer;
   a cathode catalyst layer comprising a cathode catalyst positioned on a cathode catalyst carbon-support, the cathode catalyst layer disposed over the polymeric ion conductive membrane; and
   a first sacrificial layer disposed between the cathode catalyst layer and the polymeric ion conductive layer, the first sacrificial layer comprising a reactive material that electro-oxidizes at a higher kinetic rate than the cathode catalyst carbon-support.

2. The fuel cell of claim 1 wherein the first sacrificial layer comprises a layer having a void volume and proton conductive material filling at least a portion of the void volume.

3. The fuel cell of claim 2 wherein the proton conductive material is electronically conducting.

4. The fuel cell of claim 2 wherein the proton conductive material fills from about 20% to about 100% of the void volume.

5. The fuel cell of claim 1 further comprising a second sacrificial layer disposed between the anode catalyst layer and the polymeric ion conductive layer, the second sacrificial layer comprising a reactive material that electro-oxidizes at a higher kinetic rate than the anode catalyst carbon-support.

6. The fuel cell of claim 1 wherein the corrosion rate of the reactive material is at least 2 times the corrosion rate of the cathode catalyst carbon-support.

7. The fuel cell of claim 1 wherein the corrosion rate of the reactive material is at least 5 times the corrosion rate of the cathode catalyst carbon-support.

8. The fuel cell of claim 1 wherein the corrosion rate of the reactive material is at least 10 times the corrosion rate of the cathode catalyst carbon-support.

9. The fuel cell of claim 1 wherein the reactive material has a packing density greater than or equal to about 20% by volume.

10. The fuel cell of claim 1 wherein the reactive material has a packing density greater than or equal to about 40% by volume.

11. The fuel cell of claim 1 wherein the reactive material has a packing density greater than or equal to about 50% by volume.

12. The fuel cell of claim 1 wherein the anode catalyst layer further comprises, and has dispersed therein, an additional amount of the reactive material that electro-oxidizes at a higher kinetic rate than the anode catalyst carbon-support.

13. The fuel cell of claim 1 wherein the cathode catalyst layer further comprises, and has dispersed therein, an additional amount of the reactive material that electro-oxidizes at a higher kinetic rate than the cathode catalyst carbon-support.

14. The fuel cell of claim 1 wherein the first sacrificial layer has a thickness ranging from 1 to 20 µm.

15. The fuel cell of claim 1 wherein the first sacrificial layer has a thickness ranging from 1 to 10 µm.

16. The fuel cell of claim 1 wherein the first sacrificial layer has a thickness ranging from 2 to 5 µm.

17. The fuel cell of claim 1 wherein the reactive material comprises carbon.

18. The fuel cell of claim 1 wherein the reactive material comprises carbon having a BET surface area from 200 to 2000 $m^2/g$.

19. A fuel cell comprising:
   an anode catalyst layer comprising an anode catalyst positioned on an anode catalyst carbon-support;
   a polymeric ion conductive membrane disposed over the anode catalyst layer;
   a cathode catalyst layer comprising a cathode catalyst positioned on a cathode catalyst carbon-support, the cathode catalyst layer disposed over the polymeric ion conductive membrane; and
   a first sacrificial layer disposed between either the anode catalyst layer and the polymeric ion conductive membrane or the cathode catalyst layer and the polymeric ion conductive membrane, the first sacrificial layer comprising a reactive material that electro-oxides at a higher rate than at least one of the anode catalyst carbon-support and the cathode catalyst carbon-support.

20. The fuel cell of claim 19 wherein the first sacrificial layer comprises a layer having a void volume and proton conductive material filling at least a portion of the void volume.

21. The fuel cell of claim 20 wherein the proton conductive material fills from about 20% to about 100% of the void volume.

22. The fuel cell of claim 19 further comprising a second sacrificial layer disposed between either the anode catalyst layer and the polymeric ion conductive membrane or the cathode catalyst layer and the polymeric ion conductive membrane, wherein the second sacrificial layer is disposed on an opposite side of the polymeric ion conductive membrane than the first sacrificial layer, and wherein the second sacrificial layer comprises a reactive material that electro-oxidizes at a higher rate than at least one of the anode catalyst carbon-support and the cathode catalyst carbon-support.

23. The fuel cell of claim 19 wherein the cathode catalyst layer further comprises, and has dispersed therein, a reactive material that electro-oxidizes at a higher rate than at least one of the anode catalyst carbon-support and the cathode catalyst carbon-support.

24. The fuel cell of claim 23 wherein the anode catalyst layer further comprises, and has dispersed therein, a reactive material that electro-oxidizes at a higher rate than at least one of the anode catalyst carbon-support and the cathode catalyst carbon-support.

25. The fuel cell of claim 19 wherein the reactive material comprises carbon having a BET surface area from 200 to 2000 $m^2/g$.

26. The fuel cell of claim 25 wherein the carbon is selected from the group consisting of Black Pearl, Ketjen Black, Vulcan carbon, activated amorphous carbons, high-surface area carbons, mixtures thereof, and combinations thereof.

27. The fuel cell of claim 25 wherein the carbon includes a noble metal additive selected from the group consisting of Pt, Pd, Ir, Ru, and Rh in their metallic form or as oxides, as well as alloys and mixtures thereof.

28. The fuel cell of claim 25 wherein the carbon is present in an amount from 0.1 to 0.4 mg per $cm^2$.

29. The fuel cell of claim 19 wherein the corrosion rate of the reactive material is at least 2 times the corrosion rate of the anode catalyst carbon-support or the cathode catalyst carbon-support.

30. The fuel cell of claim 19 wherein the corrosion rate of the reactive material is at least 5 times the corrosion rate of the anode catalyst carbon-support or the cathode catalyst carbon-support.

31. The fuel cell of claim 19 wherein the corrosion rate of the reactive material is at least 10 times the corrosion rate of the anode catalyst carbon-support or the cathode catalyst carbon-support.

32. The fuel cell of claim 19 wherein the reactive material has a packing density greater than or equal to about 20% by volume.

33. The fuel cell of claim 19 wherein the reactive material has a packing density greater than or equal to about 40% by volume.

34. The fuel cell of claim 19 wherein the reactive material has a packing density greater than or equal to about 50% by volume.

35. The fuel cell of claim 19 wherein the first sacrificial layer has a thickness ranging from 1 to 20 µm.

36. The fuel cell of claim 19 wherein the first sacrificial layer has a thickness ranging from 1 to 10 µm.

37. The fuel cell of claim 19 wherein the first sacrificial layer has a thickness ranging from 2 to 5 µm.

38. A fuel cell comprising:
   an anode catalyst layer;
   a polymeric ion conductive membrane disposed over the anode catalyst layer;
   a first sacrificial carbon layer disposed over the polymeric ion conductive layer, the first sacrificial carbon layer comprising carbon having a BET surface are from 200 to 2000 $m^2/g$; and
   a cathode catalyst layer comprising a cathode catalyst positioned on a carbon-support, the cathode catalyst layer disposed over the polymeric ion conductive membrane.

39. The fuel cell of claim 38 further comprising a second sacrificial layer interposed between the anode catalyst layer and the polymeric ion conductive layer.

* * * * *